M. L. GORHAM.
SEEDING-MACHINE.
No. 7,191. Reissued June 27, 1876.
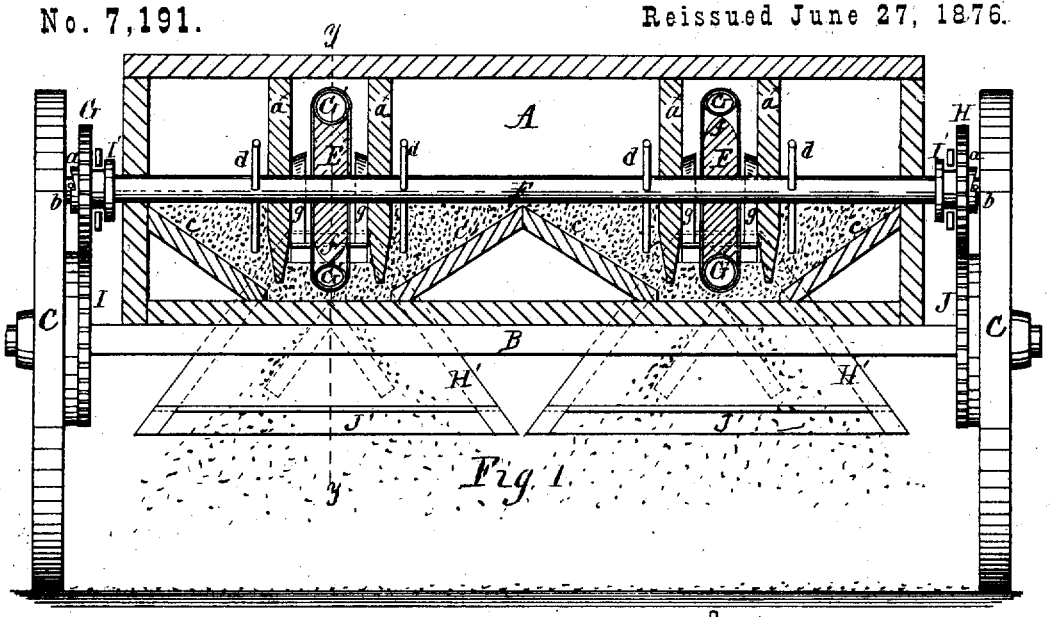
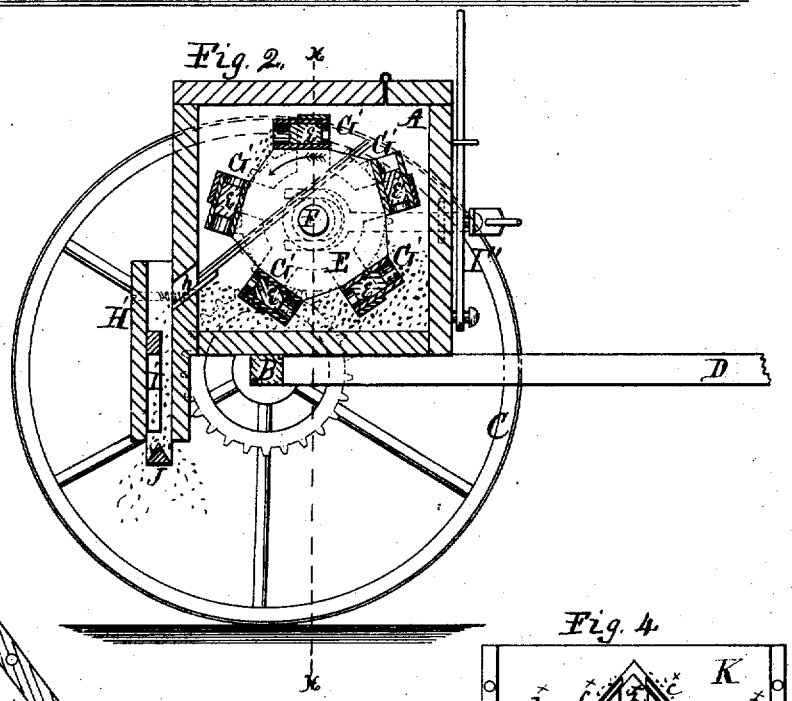
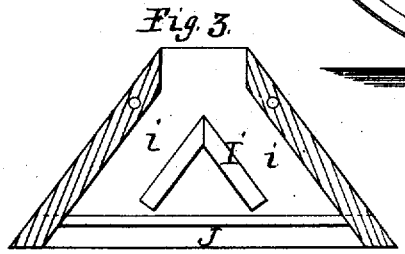
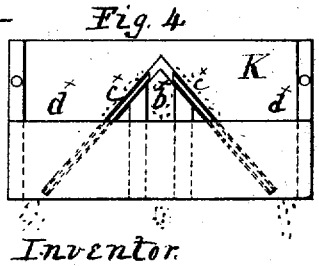
Attest.
E. A. Behel
A. P. Behel
Inventor.
Marquis L. Gorham,
Per Jacob Behel.
Attyp
N. PETERS, PHOTO-LITHOGRAPHER, WASHINGTON, D. C.

UNITED STATES PATENT OFFICE.

MARQUIS L. GORHAM, OF ROCKFORD, ILLINOIS.

IMPROVEMENT IN SEEDING-MACHINES.

Specification forming part of Letters Patent No. 32,992, dated August 6, 1861; reissue No. 7,191, dated June 27, 1876; application filed March 8, 1876.

*To all whom it may concern:*

Be it known that I, M. L. GORHAM, of the city of Rockford, in the county of Winnebago and State of Illinois, have invented a new and and Improved Seeding-Machine; and I do hereby declare that the following is a full, clear, and exact description of the same, reference being had to the annexed drawings, making a part of this specification, in which—

Figure 1 is a vertical section of my invention, taken in the line *x x*, Fig. 2; Fig. 2, a transverse vertical section taken in the line *y y*, Fig. 1; Figs. 3 and 4, detached face views of the discharging-spouts.

Similar letters of reference indicate corresponding parts in the several figures.

This invention relates to an improved seeding-machine of that class designed for sowing seed broadcast or in close drills; and consists in an improved means for discharging or distributing the seed, as hereinafter shown and described.

To enable those skilled in the art to fully understand and construct my invention, I will proceed to describe it.

A represents a seed box or hopper, which is secured to an axle, B, the wheels C C of which are placed loosely on it. D is a draft-pole attached centrally to the axle B. The main seed box or hopper A extends the whole length of the axle B, or nearly so, and within the seed box or hopper there are placed transversely vertical partitions $a^{\times}$, which extend nearly down to the bottom of the seed box or hopper, and form inclosures for the reception of seed-distributing wheels, and are constructed to admit the seed from the seed box or hopper A to the seed-distributing wheels in the inclosures formed by the transverse vertical partitions. E are seed-distributing wheels which are placed within the inclosures formed by the transverse vertical partitions $a^{\times}$, and are fitted on a shaft, F, that passes longitudinally through the hopper A. At the ends of shaft F there are placed wheels G H, one of which, G, is larger than the other, H. These wheels G H gear, respectively, into toothed wheels I J on the hubs of the wheels C C. The wheels G H are placed loosely on the ends of the shaft F, and are allowed to slide freely thereon, each wheel having a ratchet, *a*, which, by sliding the wheel, may be brought in contact with a pin, *b*, in shaft F, and thereby form a connection with the shaft. The wheels G H have levers I″ connected to them for the purpose of throwing the ratchet *a* in and out of gear with the pins *b*.

The bottom of the seed box or hopper A, except at points beneath the wheels E, is formed of inclined planes *c*, arranged as shown in Fig. 1, which serves to lessen the capacity of the seed-box, and obviates the necessity of carrying dead weight of seed, which, in the absence of the inclined planes, would be contained in the space below them, the most of which would not flow into the inclosures formed by the transverse vertical partitions, and also serve to conduct the seed contained in the seed box or hopper into the inclosures formed by the transverse vertical partitions, from which it is distributed by the action of seed-distributing wheels. The shaft F is fitted with rods or stirrers *d*, passing through it outside of partitions $a^{\times}$, which, as the shaft revolves, serve to agitate the seed to prevent it from clogging on its passage from the hopper A to the seed-distributing wheels in the inclosures formed by the transverse vertical partitions $a^{\times}$. The wheels E are provided at their peripheries with tubes G′, which have a tangential position, as shown in Fig. 2, and each tube is provided with a sliding head, *e*, by which its capacity may be varied as circumstances may require.

The peripheries of the wheels E, between the tubes G′, are beveled so as to form double-inclined planes, as shown at *f* in Fig. 1, and to the inner side of each partition $a^{\times}$ there is attached an inclined trough, *g*, which extends down to openings *h* in the back of the seed box or hopper A. (See Fig. 2.) The openings *h* communicate with the upper parts of inverted V-shaped spouts H, which have a V-shaped partition, I′, in them, as shown clearly in Fig. 3. The V-shaped partitions I′ form inclined passages *i i*, and at the lower end of each spout H′ there is placed a longitudinal bar, J′, which is of trilateral form, and placed with an angle uppermost, as shown in Fig. 2.

From the above description it will be seen that, as the machine is drawn along, the wheels E will be rotated, and the tubes G′ will carry up the seed and discharge the same at the top of the wheels upon the beveled peripheries *f*, the latter deflecting the seed into the troughs *g*, which conduct it into the spouts H′, the partitions I′ dividing the seed, so that it will fall in equal quantities through the passages *i i*. The seed falls on the bars J′, which scatter it, so that it falls on the ground in a broadcast manner.

The division of the seed of each tube G′ by the beveled peripheries *f* of the wheels E and the V-shaped partitions I′, in connection with the scattering-bars J′, insure a perfect distribution of the seed.

The quantity of seed to be sown on a given area may be regulated as desired by varying the speed of shaft F. When the wheels G I are used for rotating shaft F the latter will rotate, of course, slower than when the wheels H J are used. The distribution of the seed may also be regulated by adjusting the heads *e* of the tubes G′ so as to vary the capacity of the latter.

When it is desired to sow seed in close drills instead of broadcast, as described, the spouts H′ are detached, and spouts K secured in their place. The spouts K are externally of the same form as the spouts H′, but the former are provided with a vertical central passage, $b^{\times}$, as shown in Fig. 4, and the scattering-bar J is dispensed with. The sides $c^{\times}$ of the partition, corresponding to partitions I′ in the spout H′, are movable or adjustable longitudinally, so as to vary the area of the orifice of the central passage $b^{\times}$, and the area of the lower ends of the side passages $d^{\times}$, which correspond to *i* in the spouts H′. The spouts K, therefore, it will be seen, discharge the seed at three different points, to wit, at the lower ends of the passages $d^{\times}$ $d^{\times}$ $b^{\times}$.

I do not claim the employment or use of seed-distributing wheels provided with seed-cups having adjustable or movable bottoms, for such device has been used in seeding-machines; but I do claim as new, and desire to secure by Letters Patent—

1. In combination with the wheels E and troughs *g*, arranged as shown, the inclined surface or planes *c* placed at the bottom of the hopper A, and in the described relation with the partitions $a^{\times}$ thereof, to operate as and for the purpose set forth.

2. The spouts H′ provided with the partitions I′ and scattering-bars J′, in combination with the seed-distributing wheels E, partitions $a^{\times}$, and troughs *g*, all arranged as and for the purpose set forth.

3. The transverse vertical partitions $a^{\times}$ in main seed-box A, forming inclosures for the reception of seed-distributing wheels, and constructed to admit the seed from the main seed-box to the seed-distributing wheels in the inclosures formed by the partitions, substantially as described and shown.

4. The stirrers *d*, in combination with the inclined planes *c* and partitions $a^{\times}$, for the purpose of agitating the seed to prevent it from clogging on its passage from the main seed-box A to the seed-distributing wheels in the inclosures formed by the partitions $a^{\times}$, substantially as set forth.

5. The double inclines *c*, transverse vertical partitions $a^{\times}$, and seed-distributing wheels, fitted to revolve in the inclosures formed by the partitions, these parts constructed and arranged in the main seed-box of a seeding-machine, and combined for joint action, for the purpose of discharging the seed from the main seed-box as the machine is drawn along, substantially as set forth.

MARQUIS L. GORHAM.

Witnesses:

J. S. NEWTON,
OSCAR FINCH.